BEST AVAILABLE COPY

S. BROADBENT.
Teeth for Coal Breakers.

No. 9,456. Reissued Nov. 9, 1880.

Witnesses

Harold Serrell

Chas. H. Smith

Inventor

Sidney Broadbent per Lemuel W. Serrell atty.

N. PETERS, PHOTO-LITHOGRAPHER, WASHINGTON, D. C.

241. SOLID MATERIAL COMMINUTION OR DISINTEGRATION
294
Search Room

UNITED STATES PATENT OFFICE.

SIDNEY BROADBENT, OF SCRANTON, PENNSYLVANIA.

TOOTH FOR COAL-BREAKERS.

SPECIFICATION forming part of Reissued Letters Patent No. 9,456, dated November 9, 1880.
Original No. 192,733, dated July 3, 1877. Application for reissue filed July 12, 1880.

*To all whom it may concern:*

Be it known that I, SIDNEY BROADBENT, of Scranton, in the county of Lackawanna and State of Pennsylvania, have invented an Improvement in Rolls for Coal Crackers or Breakers, of which the following is a specification.

In the rollers that are used in coal-breakers the teeth are usually separate from the cylinder and introduced into holes or into rings. When the teeth become blunt and require to be sharpened, or when a tooth is broken, the cylinder usually has to be taken out of the breaker to allow of the teeth being sharpened or removed. This is expensive and causes considerable delay.

The teeth have also been placed into parallel holes in the cylinder, and when broken or worn they have been driven through into the cylinder, but in so doing the hole is enlarged and the regular-sized tooth will be loose when replaced in the cylinder.

The object of this invention is to construct the teeth so that they can be withdrawn or extracted from the cylinder when they become blunt or broken and their places filled by other teeth. This object is attained by providing a shoulder upon the tooth against which the grasping device acts in drawing the tooth from the cylinder.

Figure 1:
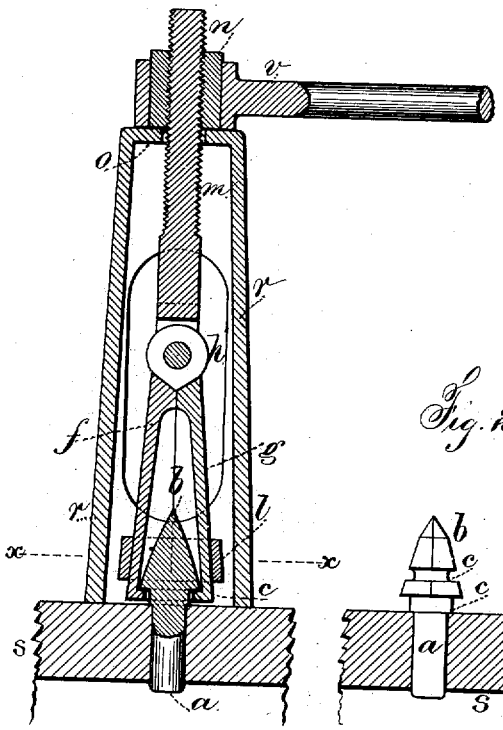
Figure 2:
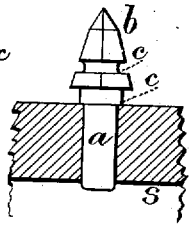
Figure 3:
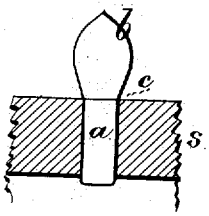
Figure 4:
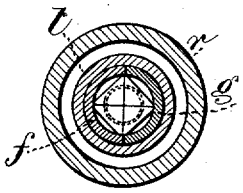

In the drawings, Figure 1 is a vertical section of the extracting-instrument and of the tooth to which it is applied. Figs. 2 and 3 show modifications in the form of the tooth; and Fig. 4 is a sectional plan, at the line *x x*, of the extracting device.

The tooth is formed of a parallel body, *a*, and tapering point *b*, with a contraction, *c*, and shoulder or enlargement sufficient for the extracting-instrument to grasp the tooth. This contraction *c* may be formed below a single square shoulder, as in Fig. 1, or a double shoulder, as in Fig. 2, or it may be a gradual curve to the base, as seen in Fig. 3. In either instance the extracting-instrument is shaped to fit below the shoulder of the teeth and grasp into the contraction with sufficient firmness for holding the tooth while being extracted.

The teeth are placed at the required distances apart, as now usual.

The extracting device is made of the jaws *f g*, hinged together at *h*, and of an internal shape to fit the teeth, and externally these jaws taper and receive the sliding ring *l*, that is driven down around them after the jaws are placed upon the tooth. This ring holds the jaws firmly upon the tooth, so that the tooth can be extracted by suitable power acting upon the jaws.

To the joint *h* the screw *m* is connected, and it receives the nut *n* above the closed end *o* of the tube *r*. The tube *r* or frame serves as a resistance for the nut *n* as the latter is revolved by a suitable wrench, *v*, to extract the tooth by drawing the instrument and tooth bodily away from the cylinder. This tube or frame *r* intervenes between the surface of the cylinder *s* and the nut *n*.

It will be understood that the attendant examines the cylinders and extracts such teeth as may be worn out or broken, and replaces them by others, that are simply driven into place by a "set" that fits upon the point.

I claim as my invention—

1. The coal-breaking cylinder having teeth that are each provided with a cylindrical shank, and a shoulder in the portion of the tooth that projects from the cylinder, to allow the tooth to be grasped or withdrawn, substantially as specified.

2. The coal-breaker tooth having a body, *a*, and a tapering point with a shoulder, beneath which the extracting-instrument acts in withdrawing the tooth, substantially as specified.

3. The coal-breaker tooth having a body, *a*, that is adapted to pass into the cylinder, and a contracted portion in the projecting part of the tooth, adapted to receive the extracting-instrument, substantially as specified.

Signed by me this 2d day of July, A. D. 1880.

SIDNEY BROADBENT.

Witnesses:
TOWNSEND DOONE,
JAMES COWAN.